United States Patent
Liess et al.

(10) Patent No.: US 6,707,027 B2
(45) Date of Patent: Mar. 16, 2004

(54) METHOD OF MEASURING THE MOVEMENT OF AN INPUT DEVICE

(75) Inventors: Martin Dieter Liess, Eindhoven (NL); Aldegonda Lucia Weijers, Eindhoven (NL); Olaf Thomas Johan Antonie Vermeulen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 9 days.

(21) Appl. No.: 09/992,709

(22) Filed: Nov. 6, 2001

(65) Prior Publication Data

US 2002/0104957 A1 Aug. 8, 2002

(30) Foreign Application Priority Data

Nov. 6, 2000 (EP) .............................................. 00203875

(51) Int. Cl.$^7$ ........................... H01J 40/14; G09G 5/08; G09G 5/00; G01P 3/36; G01B 11/02
(52) U.S. Cl. .................... 250/221; 250/222.1; 250/224; 345/157; 345/166; 345/173; 345/174; 345/175; 345/158; 345/163; 356/28.5; 356/496
(58) Field of Search .................. 345/157, 158, 345/163, 166, 173, 174, 175; 250/221, 222.1, 224; 356/28.5, 496

(56) References Cited

U.S. PATENT DOCUMENTS

| | | | |
|---|---|---|---|
| 3,644,042 A | * | 2/1972 | Kolb, Jr. et al. |
| 4,733,609 A | * | 3/1988 | Goodwin et al. |
| 5,262,636 A | * | 11/1993 | Rink |
| 5,382,785 A | * | 1/1995 | Rink |
| 6,233,045 B1 | * | 5/2001 | Suni et al. |
| 6,246,482 B1 | | 6/2001 | Kinrot et al. ............... 356/499 |
| 6,330,057 B1 | | 12/2001 | Lederer et al. ............. 356/28 |
| 6,424,407 B1 | | 7/2002 | Kinrot et al. ............... 356/28 |
| 6,452,683 B1 | | 9/2002 | Kinrot et al. ............... 356/499 |

FOREIGN PATENT DOCUMENTS

EP 0942285 9/1999 ............. G01P/3/36

OTHER PUBLICATIONS

"Small laser Doppler velocimeter based on the self-mixing effect in a diode laser" Applied Optics, vol. 27, No. 2, Jan. 15, 1988, pp. 379–385.

"Laser Doppler velocimeter based on the self-mixing effect in a fibre-coupled semiconductor laser: theory" Applied Optics, vol. 31, No. 8, Jun. 20, 1992, pp. 3401–3408.

* cited by examiner

Primary Examiner—David Porta
Assistant Examiner—David C Meyer

(57) ABSTRACT

An optical input device for an apparatus generates input signals by moving the device and an object (15) relative to each other and measures the movement by the effects of self-mixing in a diode laser (3, 5) and Doppler shift caused by the movement. For each measuring axis (X, Y, Z), radiation from a diode laser (3, 5) is converged on a window (12) across which the object (15) moves. Part of the radiation scattered by the object, whose frequency is Doppler-shifted due to the movement, re-enters the laser cavity (20) and causes a change in cavity properties. By measuring such a change, for example, by a photo diode, information about the movement is obtained. As the input device is small and cheap, it can be used in a number of different consumer apparatus.

33 Claims, 11 Drawing Sheets

METHOD OF MEASURING THE MOVEMENT OF AN INPUT DEVICE

BACKGROUND OF THE INVENTION

1. Field of the Invention

The invention relates to a method of measuring the movement of an input device and an object relative to each other along at least one measuring axis, the method comprising the steps of:

illuminating an object surface with a measuring laser beam for each measuring axis, and converting a selected portion of the measuring beam radiation reflected by the object surface into an electric signal representative of the movement along said measuring axis.

The invention also relates to an input device provided with an optical module for carrying out the method, and to an apparatus comprising such an input device.

2. Description of the Related Art

Such a method and input device known from European Patent Application No. EP-A 0 942 285, corresponding to U.S. Pat. Nos. 6,246,482, 6,330,057, 6,424,407 and 6,452,683. The input device may be an optical mouse used in a computer configuration to move a cursor across the computer display or monitor, for example, to select a function of a displayed menu. Such an optical mouse is moved across a mouse pad by hand, like a conventional mechanical mouse. As described in EP-A 0 942 285, the input device may also be an "inverted" optical mouse. The input device is then stationary and, for example, built in the keyboard of a desktop, notebook or palm computer and a human finger is moved over, for example, a transparent window in the housing of the input device. In the latter case, the input device may be small, because the optical module for measuring the finger movement can be made very small. In fact, the input device is reduced to the optical measuring module. This opens the way to new applications for the input device. For example, an input function can be built in a mobile phone for selecting functions on a menu and for accessing Internet pages, or in a remote control device for a TV set for the same purposes, or in a virtual pen.

EP-A 0 942 285 discloses several embodiments of the optical measuring module, in all of which homodyne or heterodyne detection is used. All embodiments comprise a diffraction grating arranged close to the module window. The grating reflects a portion of the illumination beam radiation, preferably radiation diffracted in one of the first orders, to a detector which also receives a portion of the radiation reflected and scattered by the object surface. The laser radiation diffracted in the first order by the grating is denoted a local oscillator beam, and the detector coherently detects the radiation from the object surface using this local oscillator beam. The interference of the local oscillator beam and the radiation reflected by the object surface reaching the detector gives rise to a beat signal from the detector, this beat signal being determined by the relative motion of the object surface parallel to this surface. The optical measuring module of EP-A 0 942 285 comprises, besides the grating, a collimator lens, a focusing lens and a pinhole diaphragm, preceding the detector, these elements having to be aligned very accurately. This complicates the manufacture and increases the cost of the module, which is intended to be a mass-produced consumer product.

SUMMARY OF THE INVENTION

It is an object of the invention to provide a method as described in the opening paragraph, which is based on another detection principle and allows the use of an optical configuration with fewer components, and is easier to manufacture. This method is characterized in that measuring beam radiation reflected back along the measuring beam and re-entering the laser cavity emitting the measuring beam, is selected, and in that changes in operation of the laser cavity, which are due to interference of the re-entering radiation and the optical wave in the laser cavity and are representative of the movement, are measured.

This new method of measuring the relative movement of an input device and an object, for example, a human finger or another object, uses the so-called self-mixing effect in a diode laser. This is the phenomenon that radiation emitted by a diode laser and re-entering the cavity of the diode laser induces a variation in the gain of the laser and thus in the radiation emitted by the laser. The object and the input device are moved relative to each other such that the direction of movement has a component in the direction of the laser beam. Upon movement of the object and the input device, the radiation scattered by the object gets a frequency different from the frequency of the radiation illuminating the object, because of the Doppler effect. Part of the scattered light is focused on the diode laser by the same lens that focuses the illumination beam on the object. Because some of the scattered radiation enters the laser cavity through the laser mirror, interference of light takes place in the laser. This gives rise to fundamental changes in the properties of the laser and the emitted radiation. Parameters which change due to the self-coupling effect, are the power, the frequency and the line width of the laser radiation and the laser threshold gain. The result of the interference in the laser cavity is a fluctuation of the values of these parameters with a frequency that is equal to the difference of the two radiation frequencies. This difference is proportional to the velocity of the object. Thus the velocity of the object and, by integrating over time, the displacement of the object can be determined by measuring the value of one of these parameters. This method can be carried out with only a few and simple components and does not require accurate alignment of these components.

The use of the self-mixing effect for measuring velocities of objects, or, in general, solids and fluids, is known per se. By way of example, reference is made to the article: "Small laser Doppler velocimeter based on the self-mixing effect in a diode laser" in Applied Optics, Vol. 27, No. 2, Jan. 15, 1988, pages 379–385, and the article. "Laser Doppler velocimeter based on the self-mixing effect in a fiber-coupled semiconductor laser: theory" in Applied Optics, Vol. 31, No.8, Jun. 20, 1992, pages 3401–3408. However, up to now, use of the self-mixing effect in an input device as defined above has not been suggested. This new application is based on the recognition that a measuring module using the self-coupling effect can be made so small and cheap that it can be installed easily and without much additional cost in existing devices and apparatus.

In order to detect the direction of movement, i.e., to detect whether the object moves forward or backward along the measuring axis, the method may be characterized in that the shape of the signal representing the variation in operation of the laser cavity is determined. This signal is an asymmetric signal and the asymmetry for a forward movement is different from the asymmetry for a backward movement.

Under circumstances where it is difficult to determine the asymmetry of the self-mixing signal, preferably another method is used. This method is characterized in that the direction of movement along said at least one measuring axis is determined by supplying the laser cavity with a periodically varying electric current and comparing first and second measuring signals with each other, these first and second measuring signals being generated during alternating first half-periods and second half-periods, respectively.

The wavelength of the radiation emitted by a diode laser increases, and thus the frequency of this radiation decreases, with increasing temperature, thus with increasing current through the diode laser. A periodically varying current through the diode laser in combination with radiation from the object re-entering the laser cavity results in a number of radiation pulses per half-period and thus in a corresponding number of pulses in the measured signal. If there is no relative movement of the input device and the object, the number of signal pulses is the same in each half-period. If the device and the object move relative to each other, the number of pulses in one half-period is larger or smaller than the number of pulses in the next half-period, depending on the direction of movement. By comparing the signal measured during one half-period with the signal measured during the next half-period, not only the velocity of the movement, but also the direction of the movement can be determined.

This method may be further characterized in that the first and second measuring signals are subtracted from each other.

The method of measuring the movement is preferably further characterized in that it is used to perform a click action by a single movement of the object and the input device relative to each other along an axis which is substantially perpendicular to the object surface.

The single movement also results in a Doppler shift of radiation of the measuring beam scattered and reflected by the object surface towards the laser cavity so that it can be determined whether the single movement has been performed by measuring the change of a relevant parameter of the laser cavity. After a cursor of, for example, a computer has been placed, on a desired function of a displayed menu chart under the control of the X- and Y-movement measuring systems of the input device, this function can be activated by the single movement in the Z-direction.

The method of measuring is preferably further characterized in that it is used to determine both a scroll action and a click action by movement of the object and the input device relative to each other in a first direction parallel to the object surface and in a second direction substantially perpendicular to the object surface.

A scroll action is understood to mean an up/down, or down/up, movement of a cursor across a menu. Such an action can be realized by moving a finger in a given direction over the input device. With this method, measurements along a first measurement axis, parallel to the object surface, and a second measurement axis, substantially parallel to the object surface, may be carried out. The first measurement furnishes information about the scroll-action and the second measurement furnishes information about the click action. Alternatively the two measurement axes may be at opposite angles relative to a normal to the object surface. Then the signals of the two measurement axes both comprise information about the scroll action and the click action. The specific scroll action information as well as the specific click action information can be isolated by appropriate combining the signals of the two measuring actions.

The changes in the operation of the laser cavity can be determined in several ways.

A first embodiment of the measuring method is characterized in that the impedance of the diode laser cavity is measured.

The impedance of the laser diode is one of the parameters which change due to the interference effect, and is a function of the relative movement of the input device and the object. This impedance can be determined by measuring the voltage across the diode laser and dividing the measured voltage value by the known value of the electric current sent through the diode laser.

A preferred embodiment of the method is characterized in that the intensity of the laser radiation is measured.

Measuring the intensity of the laser radiation is the simplest way of determining the changes in the laser cavity, because this can be done with a simple photo diode.

The invention also relates to an input device provided with an optical module for carrying out the method, this module comprising at least one laser, having a laser cavity, for generating a measuring beam, optical means for converging the measuring beam in a plane near the object, and converting means for converting a measuring beam radiation reflected by the object into an electric signal. The plane may be a plane of a window in the module housing or a plane near this window. This input device is characterized in that the converting means is constituted by the combination of the laser cavity and measuring means for measuring changes in operation of the laser cavity, these changes being due to interference of reflected measuring beam radiation re-entering the laser cavity and the optical wave in this cavity, and being representative of the relative movement of the object and the module.

By implementing the optical module in existing input devices, the input devices can be made simpler, cheaper and more compact. Moreover, new applications of input devices, especially in consumer products, become possible.

A first embodiment of the input device is characterized in that the measuring means is means for measuring a variation of the impedance of the laser cavity.

A preferred embodiment of the input device is characterized in that the measuring means is a radiation detector for measuring radiation emitted by the laser.

The radiation detector may be arranged in such a way that it receives part of the radiation of the measuring beam.

This embodiment of the input device is, however, preferably characterized in that the radiation detector is arranged at the side of the laser cavity opposite the side where the measuring beam is emitted.

Generally, diode lasers are provided with a monitor diode at their rear side. Usually, such a monitor diode is used to stabilize the intensity of the laser beam emitted at the front side of the diode laser. According to the invention, the monitor diode is used to detect changes in the laser cavity generated by radiation of the measuring beam re-entering the laser cavity.

An input device for measuring a movement of an object and the device relative to each other in a plane parallel to the illuminated surface of the object, is characterized in that it comprises at least two diode lasers and at least one detector for measuring the relative movement of the object and the device along a first and a second measuring axis, these axes being parallel to the illuminated surface of the object.

As will be explained later, this device and other devices utilizing two or more measuring beams, may be provided with a separate detector for each measuring beam. However, it is also possible to use one and the same detector for all measuring beams if time-sharing is used.

An input device which allows a third relative movement of the object and the device to be determined, is characterized in that it comprises three diode lasers and at least one detector for measuring a relative movement of the object and the device along a first, a second and a third measuring axis, the first and second axes being parallel to the illuminated surface of the object, and the third axis being substantially perpendicular to this surface.

This embodiment of the input device recognizes a single movement of the object and the device along the third measuring axis and converts it into an electric signal by means of which a click action may be determined.

An input device which allows determining both a scroll action and a click action is characterized in that it comprises two diode lasers and at lest one detector for measuring relative movements of the object and the device along a first measuring axis parallel to the object surface and along a second measuring axis substantially perpendicular to the object surface.

The first measuring axis is used to determine a scroll action and the second measuring axis is used to determine a click action.

Alternatively, this input device may be characterized in that it comprises two diode lasers and at least one detector for measuring relative movements of the object and the device along a first and a second measuring axis, these axes being at opposite angles with respect to a normal to the object surface.

The signals from both measuring axes comprise information about the scroll action and the click action, and by appropriately combining the information of the two measuring axes, the specific scroll action information can be isolated, as well as the specific click action information.

With respect to the constructional aspect, the input device may have several embodiments. A first embodiment is characterized in that the optical means comprises a lens arranged between said at least one laser and associated detector, on the one hand, and an action plane, on the other hand, the at least one laser being positioned eccentrically with respect to the lens.

An action plane is understood to mean a plane where a movement is measured, i.e., a plane where movement takes place and where measurement beams arrive. The action plane may be the plane of a window in the device housing or a plane near this window. The lens may be a rotationally symmetric lens or may have another shape. Due to the eccentric position of the lasers with respect to the lens element, it is ensured that corresponding illumination beams are incident on the window of the device at an acute angle so that these beams have a component along the associated measuring axis. For the following explanation, the term optical axis is introduced, which is understood to mean the symmetry axis of the lens, or the module, which axis is perpendicular to the window of the module.

If this embodiment comprises two diode lasers, it may be characterized in that the diode lasers are arranged such that the lines connecting their centers with the optical axis of the lens are at an angle of substantially 90° with respect to each other.

If this embodiment comprises three diode lasers, it may be characterized in that the diode laser are arranged such that the lines connecting their centers with the optical axis of the lens are at angles of substantially 120° with respect to each other.

The output signals of the detectors can be supplied to a common signal-processing circuit wherein at least two of the detector signals are used for each measuring axis to determine the movement along the relevant axis. In this way, more accurate values for the movements can be obtained.

In the input device, a diode laser of the type VCSEL (vertical cavity surface emitting laser) may be used. Such a laser emits radiation in the vertical direction, making it suitable for the present device. However, currently, since such a laser is quite costly, it is not very suitable for consumer mass products.

For this reason, preference is given to an input device which is characterized in that each diode laser is a horizontal emitting laser, and in that the device comprises, for each diode laser, a reflecting member reflecting the beam from the associated diode laser to an action plane.

Horizontal emitting diode lasers are the most commonly used lasers and are much cheaper than a VCSEL. Providing the device with a reflecting member adds little to the costs of this device.

An embodiment of the input device, which can be manufactured relatively easily and at low cost, is characterized in that it is composed of a base plate on which the at least one diode laser and associated detector are mounted, a cap member fixed to the base plate and comprising the window, and a lens accommodated in the cap member.

This embodiment is composed of only three portions which can be assembled easily and without severe alignment requirements.

An embodiment of the input device, which is even easier to manufacture, is characterized in that the lens is integrated in the cap member having an internal surface which is curved towards the base plate.

This embodiment is composed of only two portions.

These embodiments are preferably further characterized in that the base plate, the cap member and the lens are made of a plastic material.

Components made of such a material may be cheap and low weight and thus are suitable for consumer products. Only the material of the lens should be transparent and have some optical quality.

An alternative embodiment, i.e., without a lens, is characterized in that each diode laser is coupled to the entrance side of a separate light guide, the exit side of which is positioned at the window of the device.

In this embodiment, the radiation of an illumination beam is well isolated from its surroundings so that cross talk between the movements along different axes is eliminated or strongly is reduced.

This embodiment is preferably characterized in that the light guides are optical fibers. Optical fibers are flexible, have a small cross-section and show little attenuation per length unit, and thus allow location of the window of the device at a larger distance from the diode lasers and the detectors.

The embodiment with optical fibers is preferably characterized in that it comprises three diode lasers and three light guides, and in that the exit sides of the light guides are arranged in a circle at a mutually angular spacing of substantially 120°.

The input device may be used in different applications, such as, in a mouse for a desktop computer, in a keyboard of a desktop or laptop computer, in a remote control unit for different apparatus, in a mobile phone, etc.

BRIEF DESCRIPTION OF THE DRAWINGS

These and other aspects of the invention are apparent from and will be elucidated, by way of non-limitative example, with reference to the embodiments described hereinafter. In the drawings.

DESCRIPTION OF THE PREFERRED EMBODIMENTS

Figure 1A:
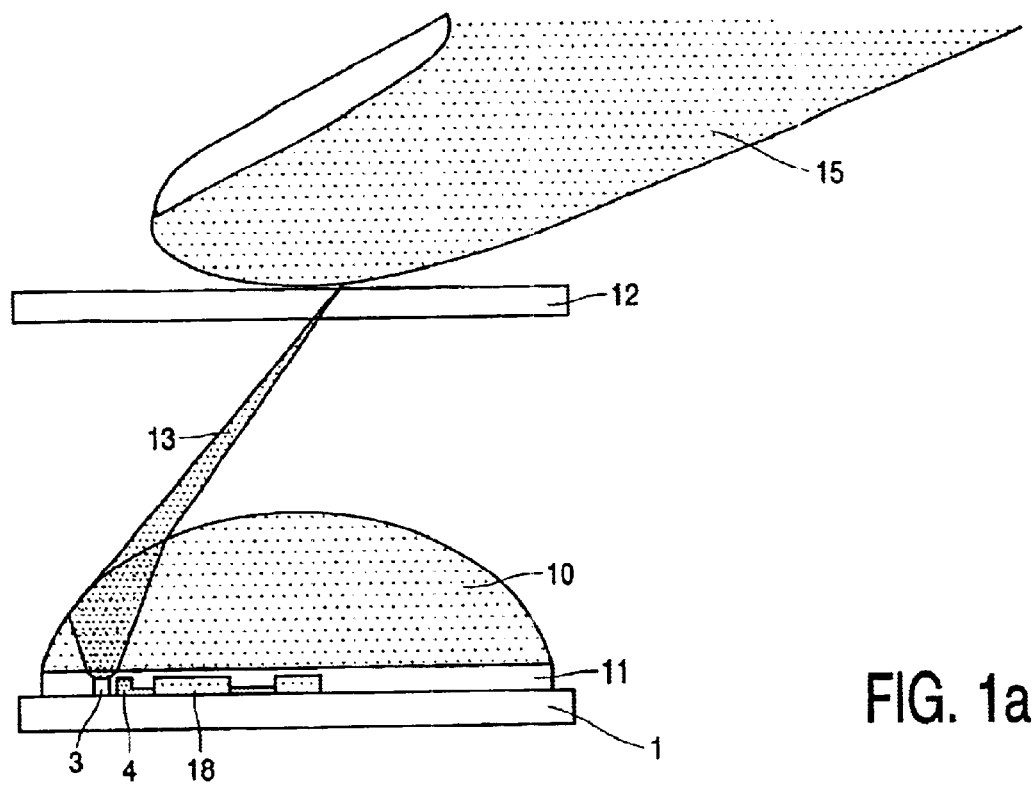
FIG. 1a shows, in cross-section, a first embodiment of the device according to the invention.
Figure 1B:
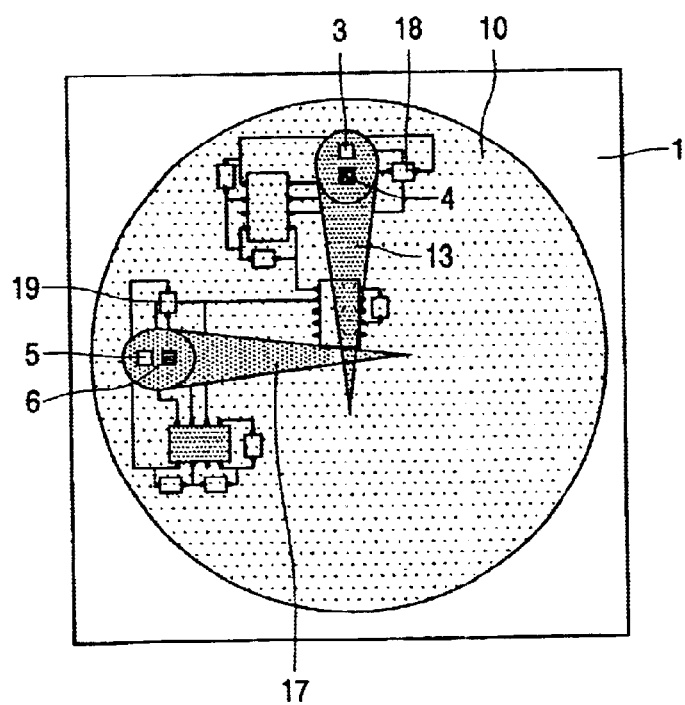
FIG. 1b is a top view of this device.

FIG. 1a is a diagrammatic cross-section of the input device. The device comprises, at its lower side, a base plate 1, which is a carrier for the diode lasers, in this embodiment lasers of the type VCSEL, and the detectors, for example, photo diodes. In FIG. 1a, only one diode laser 3 and its associated photo diode 4 is visible, but usually at least a second diode laser 5 and associated detector 6 is provided on the base plate, as shown in the FIG. 1b top view of the apparatus. The diode lasers 3 and 5 emit laser, or measuring, beams 13 and 17, respectively. At its upper side, the device is provided with a transparent window 12 across which an object 15, for example, a human finger is to be moved. A lens 10, for example, a plano-convex lens, is arranged between the diode lasers and the window. This lens focuses the laser beams 13 and 17 at or near the upper side of the transparent window. If an object 15 is present at this position, it scatters the beam 13 (and 17). A part of the radiation of beam 13 is scattered in the direction of the illumination beam 13 and this part is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which converts the radiation variation into an electric signal, and applies the electric signal to an electronic circuit 18 for processing this signal. The illumination beam 17 is also focused on the object, scattered thereby and part of the scattered radiation re-enters the cavity of the diode laser 5. The circuits 18 and 19, for the signal of the photo diodes 4 and 6, shown in FIGS. 1a and 1b, have only illustrative purposes and may be more or less conventional. As is illustrated in FIG. 1b, these circuits are interconnected.

Figure 2:
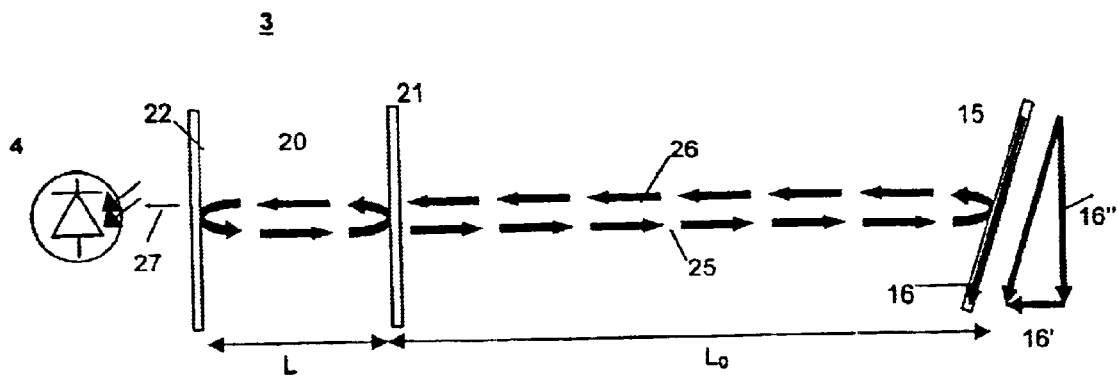
FIG. 2 illustrates the principle of the measuring method of the input device.

FIG. 2 illustrates the principle of the input device and the method of measuring, according to the present invention, when a horizontal emitting diode laser and a monitor photo diode arranged at the rear facet of the laser are used. In this Figure, the diode laser, for example, diode laser 3 is schematically represented by its cavity 20 and its front and rear facets, or laser mirrors, 21 and 22, respectively. The cavity has a length L. The object, whose movement is to be measured, is denoted by reference numeral 15. The space between this object and the front facet 21 forms an external cavity, which has a length $L_o$. The laser beam emitted through the front facet is denoted by the reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the illumination beam 13, the reflected radiation 26 undergoes a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e., a self-mixing effect occurs in the cavity. Dependent on the amount of phase shift between the optical wave and the radiation re-entering the cavity, this interference will be constructive or negative, i.e., the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of the self-mixing effect and the Doppler shift causes a variation in the behavior of the laser cavity; especially its gain, or light amplification, varies.

Figure 3:
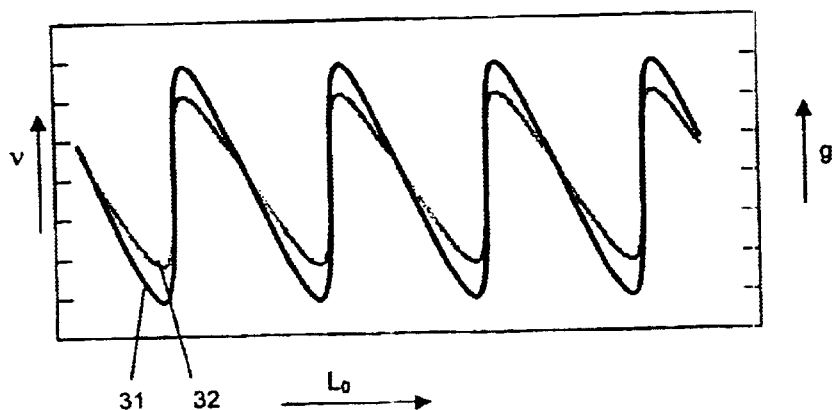
FIG. 3 shows the variation of the optical frequency and of the gain of the laser cavity as a function of the movement of the device and the object relative to each other.

This is illustrated in FIG. 3. In this figure, curves 31 and 32 represent the variation of the frequency n of the emitted laser radiation and the variation of the gain g of the diode laser, respectively, as a function of the distance $L_o$ between the object 15 and the front mirror 21. Both n, g and $L_o$ are in arbitrary units. As the variation of the distance $L_o$ is the result of movement of the object, the abscissa of FIG. 3 can be re-scaled in a time axis, so that the gain will be plotted as a function of time. The gain variation $\Delta g$ as a function of the velocity v of the object is given by the following equation:

$$\Delta g = -\frac{K}{L} \cdot \cos \cdot \left( \frac{4\pi \cdot \upsilon \cdot v \cdot t}{c} + \frac{4\pi \cdot L_0 \cdot t}{c} \right)$$

In this equation:
- K is the coupling coefficient to the external cavity; it is indicative of the quantity of radiation coupled out of the laser cavity;
- ν is the frequency of the laser radiation;
- v is the velocity of the object in the direction of the illumination beam;
- t is the moment of time; and
- c is the light velocity.

The equation can be derived from the theory on the self-mixing effect disclosed in the two articles mentioned herein above.

The object surface is moved in its own plane, as is indicated by the arrow 16 in FIG. 2. Because the Doppler shift occurs only for an object movement in the direction of the beam, this movement 16 should be such that it has a component 16' in this direction. Thereby, it becomes possible to measure the movement in an XZ plane, i.e., the plane of drawing of FIG. 2, this movement being called the X movement. FIG. 2 shows that the object surface has a skew position with respect to the rest of the system. In practice, usually the measuring beam is a skew beam and the movement of the object surface will take place in an XY-plane. The Y-direction is perpendicular to the plane of the drawing in FIG. 2. The movement in this direction can be measured by a second measuring beam, emitted by a second diode laser, and scattered light of which is captured by a second photo diode associated with the second diode laser. A (the) skew illumination beam(s) is (are) obtained by arranging the diode laser(s) eccentrically with respect to the lens 10, as shown in FIG. 1.

Measuring the variation of the laser cavity gain caused by the object movement by measuring the intensity of the radiation at the rear laser facet with a monitor diode, is the simplest, and thus the most attractive way. Conventionally, this diode is used for keeping the intensity of the laser radiation constant, but now it is also used for measuring the movement of the object.

Figure 4:
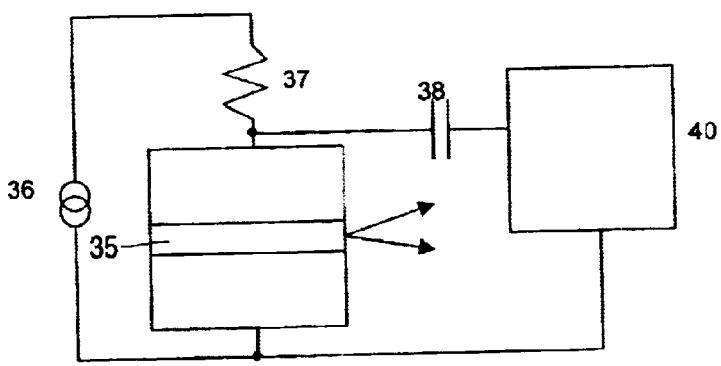
FIG. 4 illustrates a method of measuring this variation.

Another method of measuring the gain variation, and thus the movement of the object, makes use of the fact that the intensity of the laser radiation is proportional to the number of electrons in the conduction band in the junction of the laser. This number, in turn, is inversely proportional to the resistance of the junction. By measuring this resistance, the movement of the object can be determined. An embodiment of this measuring method is illustrated in FIG. 4. In this figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms a high impedance for the signal across the diode laser.

Besides the amount of movement, i.e., the distance across which the object is moved and which can be measured by integrating the measured velocity with respect to time, also the direction of movement has to be detected. This means that it has to be determined whether the object moves forward or backward along an axis of movement. The direction of movement can be detected by determining the shape of the signal resulting from the self-mixing effect. As shown by waveform 32 in FIG. 3, this signal is an asymmetric signal. The waveform 32 represents the situation where the object 15 is moving towards the laser. The rising slope 32' is steeper than the falling slope 32". As described in the above-mentioned article in Applied Optics, Vol. 31, No. 8, Jun. 20, 1992, pages 3401–3408, the asymmetry is reversed for a movement of the object away from the laser, i.e., the falling slope is steeper than the rising slope. By determining the type of asymmetry of the self-mixing signal, the direction of movement of the object can be ascertained. Under certain circumstances, for example, for a smaller reflection coefficient of the object or a larger distance between the object and the diode laser, it may become difficult to determine the shape or asymmetry of the self-mixing signal.

Figure 5:
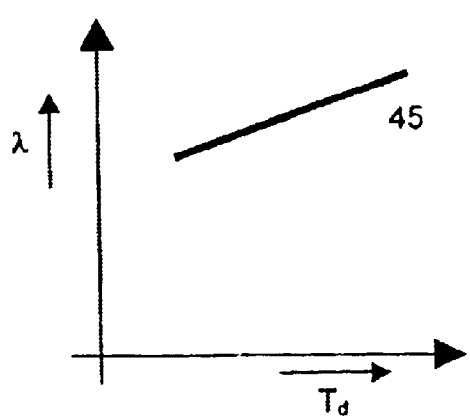
FIG. 5 shows the variation of laser wavelength as a function of the temperature of the laser with optical feedback.

In another, preferred, method of determining the direction of movement, use is made of the fact that the wavelength 1 of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 5 shows the temperature ($T_d$) dependency of the wavelength 1 of the emitted radiation. In this Figure, both the horizontal axis, $T_d$, and the vertical axis, λ, are in arbitrary units.

Figure 6:
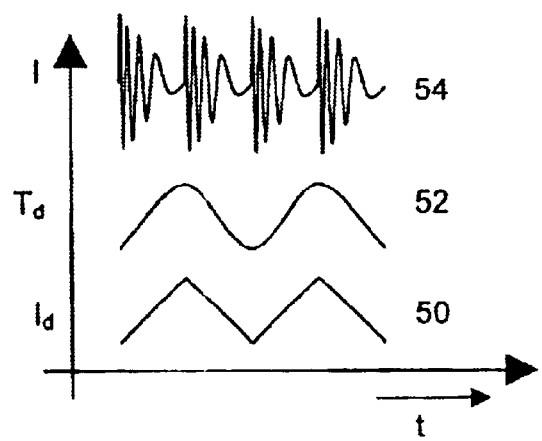
FIG. 6 shows the effect of the use of a periodically varying drive current for a laser.

If, as is shown in FIG. 6, a periodic drive current $I_d$, represented by the waveform 50, is supplied to the diode laser, the temperature $T_d$ of the diode laser rises and falls periodically, as shown in waveform 52. This results in a standing optical wave in the laser cavity which has a periodically varying frequency, and, thus, a continuously varying phase shift with respect to the radiation reflected by the object and re-entering the cavity with a certain time delay. In every half-period of the drive current, there are now successive time segments wherein the diode laser gain is higher and lower, depending on the phase relation of the wave in the cavity and the reflected radiation re-entering the cavity. This results in a time-dependent intensity variation (I) of the emitted radiation as shown in waveform 54 of FIG. 6. This waveform represents the situation for a stationary, or non-moving, object. The number of pulses in a first half-period ½p(a) is equal to the number of pulses in a second half-period ½p(b).

A movement of the object causes a Doppler shift of the radiation re-entering the laser cavity, i.e., this frequency increases or decreases depending on the direction of movement. A movement of the object in one direction, the forward direction, causes a decrease of the wavelength of the re-entering radiation, and a movement in the opposite direction causes an increase in the wavelength of this radiation. The effect of the periodic frequency modulation of the optical wave in the laser cavity is that, in case the Doppler shift has the same sign as the frequency modulation in the laser cavity, the effect of Doppler-shifted radiation re-entering the cavity is different from the effect this radiation has in case the frequency modulation and Doppler shift have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half-period ½p(a) of the driving laser current, the wavelength of the generated laser radiation increases. In the case of a backward moving object, the wavelength of the re-entering radiation also increases, so that the difference between the frequencies of the wave in the cavity and that of the radiation re-entering this cavity is lower. Thus, the number of time segments during which the wavelength of re-entering radiation is adapted to the wavelength of the generated radiation is smaller than in the case of absence of electrical modulation of the emitted laser radiation. This means that, if the object moves in the backward direction, the number of pulses in the first half-period is smaller than if no modulation would be applied. In the second half-period ½p(b), wherein the laser temperature and the wavelength of the generated radiation decrease, the number of time segments wherein the wavelength of the re-entering radiation is adapted to that of the generated radiation increases. Thus, for a backward moving object, the number of pulses in the first half-period is smaller than the number of pulses in the second half-period. This is illustrated in waveform 58 of FIG. 7, this waveform showing the intensity $I_b$ of the laser radiation emitted if the object moves in the backward direction. Comparing this waveform with waveform 54 of FIG. 6 shows that the number of pulses in the first half-period has decreased, and the number of pulses in the second half-period has increased.

Figure 7:
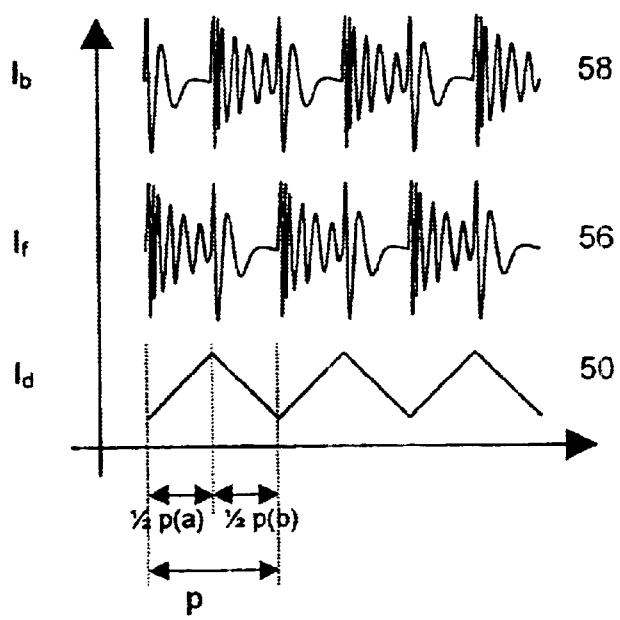
FIG. 7 illustrates how the direction of movement is detected.

It will be clear from the above reasoning that if the object moves in the forward direction, in which the wavelength of radiation scattered by the object and re-entering the laser cavity decreases due to the Doppler effect, the number of pulses in a first half-period ½p(a) is larger than the number of pulses in a second half-period ½p(b). This can be verified by comparing waveform 56 of FIG. 7, representing the intensity $I_f$ of the radiation emitted in the case of a forward moving object. In an electronic processing circuit, the number of photo diode signal pulses counted during the second half-period ½p(b) is subtracted from the number of pulses counted during the first half-periods ½p(a). If the resulting signal is zero, the object is stationary. If the resulting signal is positive, the object moves in the forward direction and if this signal is negative, the object moves in the backward direction. The resulting number of pulses is proportional to the velocity of the movement in the forward and backward directions, respectively.

Under certain circumstances, for example, if the optical path length between the laser and the object is relatively small and the frequency and amplitude of the electrical modulation are relatively small, while the movement to be detected is relatively fast, it may occur that the number of pulses generated by the Doppler effect is higher than the number of pulses generated by the electrical modulation. In such situations, the direction of movement can still be detected by comparing the number of pulses during a first half-period with the number of pulses during a second half-period. However, the velocity is then not proportional to the difference of these two numbers. In order to determine the velocity in such situations, the two numbers should be averaged and a constant value should be subtracted from the result. The number obtained in this way, is a measure for the velocity. A person skilled in the art can easily design an electronic circuit for carrying out this calculation.

Instead of the triangular shaped drive current $I_d$ used in the embodiment described with reference to FIGS. 5 and 6, also a drive current of another shape, such as rectangular shape, may be used.

The method of measuring the velocity and the direction of the object movement described above can also be used if the gain variation is determined by measuring the variation of the resistance of the diode laser cavity.

The measuring method requires only a small Doppler shift, for example, in terms of wavelength, a shift of the order of $1.5 \times 10^{-16}$ m, which corresponds to a Doppler frequency shift of the order of 100 kHz for a laser wavelength of 680 nm.

Figure 8:
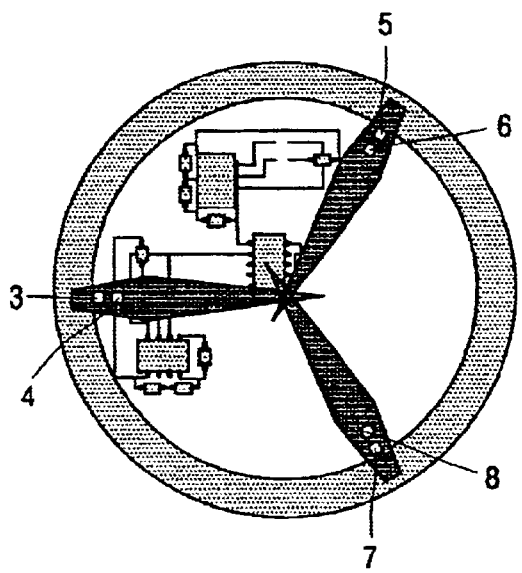
FIG. 8 shows a diagram of an input device with three measuring axes.

Object movements along two perpendicular (X and Y) directions, or measuring axis, in one plane can be measured with the input device of FIG. 1, this device comprising two diode lasers and associated photo diodes in a perpendicular orientation. Adding a third diode laser and an associated photo diode to the device enables this device to measure also the movement along a third, Z-, direction, or measuring axis. The third diode laser may be arranged on the optical axis of the lens 10 so that the third illumination beam is perpendicularly incident on the window 12 and the object and has no components in the other directions. An optimum measuring signal for the Z direction may then be obtained. In order to increase the reliability and accuracy of the X and Y measuring signals, three diode lasers are preferably arranged in a circle and at a mutual angular distance of 120°. This configuration is shown in FIG. 8 wherein the third diode laser and third photo diode are denoted by the reference numerals 7 and 8, respectively. If the output signals of the photo diodes 4, 6 and 8, or the resistance measuring signals, are represented by $S_4$, $S_6$ and $S_8$, respectively, the object velocities $V_x$, $V_y$ and $V_z$ along the X, Y and Z measuring axes, respectively, can be calculated, for example, as follows:

$V_x = 2S_4 - S_6 - S_8$ $V_y = \sqrt{3} \cdot (S_8 - S_6)$ $V_z = 1/\sqrt{2} \cdot (S_4 + S_6 + S_8)$ The electronic circuit for performing this calculation comprises summing and subtracting elements and is relatively easy to implement.

The values of the velocities and, by integration with respect to time duration of movement, the distance of the movement in the X and Y directions obtained in this way are more reliable and accurate, because they are the result of averaging the output signals of at least two photo diodes. Movement errors, or unwanted movements, such as slightly lifting the finger, have a similar effect on the output signals of the photo-diodes. As the movements along the X and Y measuring axes are determined by subtracting output signals from each other, the influence of an unwanted movement on the X- and Y measuring signal is eliminated. Only the Z-measuring signal, $V_z$, which is obtained by adding the output signals of the three photo diodes is indicative of an up/down movement of the finger, or another object.

In applications wherein the movement of a human finger in the Z direction and the input device relative to each other is used to perform a click function, it suffices to detect that such a movement takes place. An accurate measuring of the displacement of the object is not necessary so that the Z-measurement may be rather rough. Even the direction of the movement need not be detected.

Hardly any requirements have to be set to the structure or reflection coefficient of the object which is moved relative to the input device. It has been demonstrated that also the relative movement of a piece of blank paper and the device can be easily measured.

From an optical point of view, the dimensions of the optical module may be very small. The size of the input device is mainly determined by the amount of electronics that has to be incorporated in the device and by the aspect of easy mass manufacturing. In practical embodiments, the window has a size of 3 mm to 5 mm squared. Because of the measuring principle used in this device, its components need not be aligned accurately, which is a great advantage for mass production.

In the embodiment of FIG. 1, the lens 10 may be made of glass or a transparent plastic material, for example, polycarbonate (PC) or polymethyl methacrylate (PMMA). Such a lens can be fixed to the substrate carrying the diode lasers, the photo diodes and processing circuitry, by means of a transparent glue layer 11, for example, of epoxy. For this embodiment, it is assumed that the diode lasers radiate in the vertical direction, so that these lasers may be of the VCSEL type. Such a laser can easily be placed on the base plate by means of a wire bounding technique.

Figure 9A:
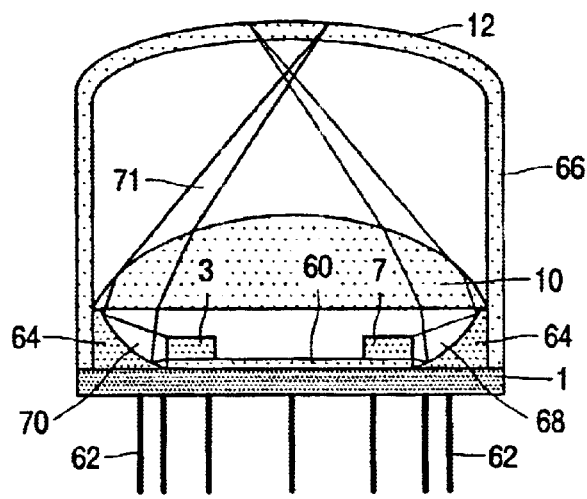
FIGS. 9a and 9b show a second embodiment of the input device.
Figure 9B:
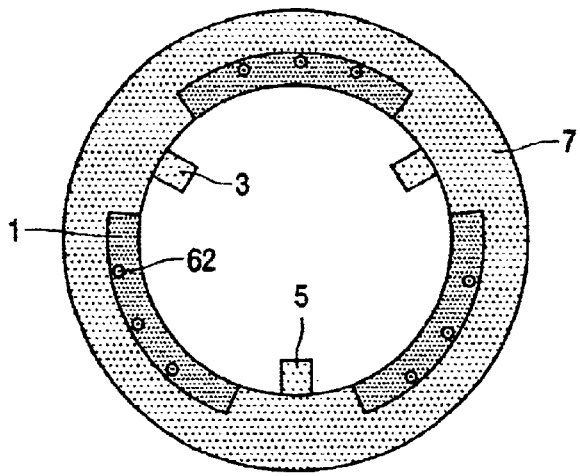

Preferably more conventional side emitting diode lasers, having a horizontal cavity, are used because they are considerably cheaper. Such a laser can be mounted in such a way that it radiates in the vertical direction. For example, the laser can be mounted on a small table. It is, however, also possible to mount side-emitting diode lasers in such a way that they emit in the horizontal direction. FIG. 9a is a vertical cross-section of an embodiment of the input device with such lasers, and FIG. 9b is a top view of the lower part of this device. In these figures, 1 is the base, or housing, plate from which electrical contact pins 62 protrude. This base plate has such heat-conduction that it can function as a cooling element for the diode lasers. The electronic circuitry, shown schematically in the FIGS. 1 and 8, may be mounted on a layer 60 of silicon or another material, this layer forming a circuit board. Also the embodiment of FIG. 1 may comprise such a layer. Elements 3, 5 and 7 are the side emitting diode lasers. For each of these lasers, a reflecting member 64 is provided for reflecting the horizontally emitted beam 68, 70 from the diode lasers in the vertical direction through the lens 10 towards the window 12 at the top of the device. Preferably the reflecting elements have a spherical shape so that they have also some optical power and convert the incident diverging beam 68, 70 into a less divergent, or a collimated, or even slightly converging, beam. The optical power of the lens 10 can then be smaller than that of the lens 10 in the embodiment of FIG. 1. Also in the embodiment of FIGS. 9a and 9b, the lens 10 may be a glass lens, but is preferably a plastic lens. A plastic lens is cheaper and lighter than a glass lens and is very suitable in this application because no stringent optical requirements are set to this lens. A cap 66, which is preferably made of plastics and is provided with a transparent window 12, forms the housing of the device together with the housing plate 1. The three, or in case only two diode lasers are used, the two, reflecting members may be constituted by one plastic ring which is covered by a reflecting coating. The plastic ring may form an integral part of the base plate 1. The input device then mainly consists of plastic material and is composed of only three constructional parts, which can easily be assembled. These parts are: the base plate 1, which is provided with the reflecting ring, the contact pins 62 and the diode lasers and associated photo diodes, the lens 10 and the cap 66 provided with the window 12.

Figure 10:
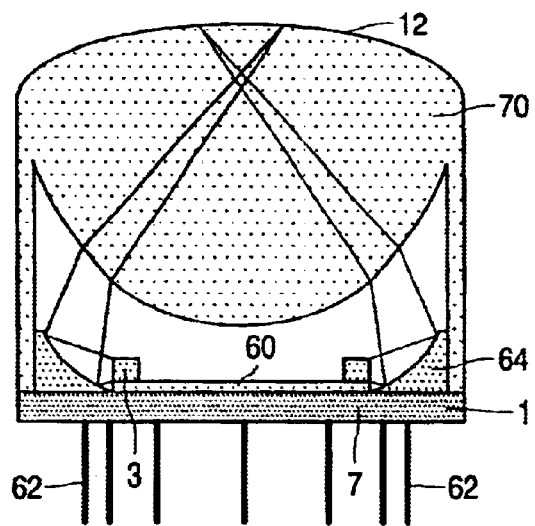
FIG. 10 shows a third embodiment of this device.

FIG. 10 shows a preferred embodiment of the input device wherein a further integration of parts has been carried out. In this embodiment, the cap 66 and the lens 10 of the embodiment of FIG. 9a are replaced by a single plastic element 70, the lower side of which is curved towards the base plate. This curved surface has the same refractive effect on the illumination beams as the lens 10 in FIG. 9a. A top view of the lower part of the embodiment of FIG. 10 is not shown because this part is the same as that of FIGS. 9a and 9b. The embodiment shows in FIG. 10 is composed of only two constructional parts and is even easier to assemble than the embodiment shown in FIGS. 9a and 9b.

In the embodiments shows in FIGS. 8, 9a, 9b, 10, 11a and 11b, the illumination beams are not focused in the plane of the window. As, moreover, these beam originate from different positions at the base plate level, the illumination beams form illumination spots at different positions in the action plane, for example, the plane of the window. The illumination beams and their scattered radiation are sufficient spatially separated, so the crosstalk between the different measuring axes is no problem in the input device according to the invention. If necessary, a residual crosstalk can be reduced by using diode lasers with slightly different wavelengths. For this purpose, a wavelength difference of a few nm is sufficient.

Another possibility of eliminating crosstalk is the use of a control drive for the diode lasers, which causes only one laser to be activated at any moment. A multiplexing driving circuit, this circuit alternately activating the different diode lasers, may constitute such a control drive. Such multiplexing circuit allows the monitoring of two or three diode lasers by ne detector, or photodiode, which is arranged within reach of each of the diode lasers and is used in a time-sharing mode. An additional advantage of the embodiment with such a driving circuit, is that the space needed for the circuitry and the electric power consumption of the device is reduced.

Figure 11A:
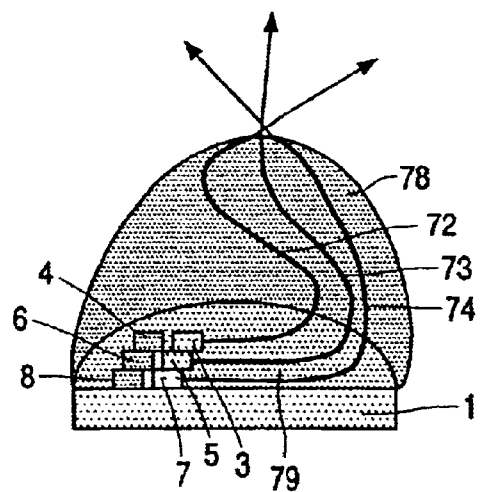
FIGS. 11a and 11b show a fourth embodiment of this device.
Figure 11B:
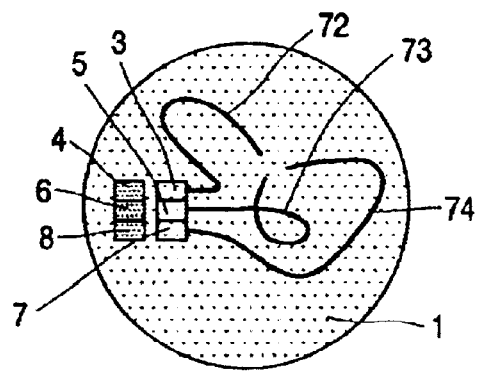

FIGS. 11a and 11b show an embodiment of the input device wherein the illumination beams are guided to the window by optical fibers. FIG. 11 is a vertical cross-section and FIG. 11b is a top view of this embodiment. The input ends of the fibers 72, 73 and 74 are optically coupled to the diode lasers 3,5 and 7, respectively, in a well-known way. All output ends of the fibers are located at the window of the device. The fibers may be embedded in a cap 78 of solid material, for example, epoxy or another transparent or non-transparent material. Each of these fibers forms an isolator for the radiation guided by this fiber, both for the illumination radiation from the associated diode laser and the scattered radiation returning to this laser. As a consequence, the possibility of crosstalk between the different measuring axes is very small to none. Other advantages of fibers are that they are flexible, which increases the design possibilities, and that they can transport the radiation over arbitrary distances so that the diode lasers and photodiodes can be arranged at quite remote distances from the window of the input device. In the embodiment of FIGS. 11a and 11b, the diode lasers and associated photo diodes are arranged close together. These elements may be arranged in a separate compartment 79, as shown in FIG. 11a, this compartment being of the same material as the cap or of another material.

Instead of fibers, other light guides may be used, for example, channels in a body of transparent or non-transparent material.

The embodiments of FIGS. 8–11b may be provided with two, instead of three, diode lasers. This will be the case if the input device has to measure only X and Y movements and a Z measurement, for example, for a click function, is not needed. Instead of diode lasers, other small laser devices may be used and other small radiation-sensitive devices may replace the photo diodes.

As the input device described above can be manufactured at low costs, it is very suitable to be implemented in mass-produced consumer apparatus. Because of its very small size and light-weight, this device can easily be integrated in existing apparatuses, thereby increasing the capabilities of these apparatuses without substantially increasing their costs and weight and without changing their original design.

Figure 12:
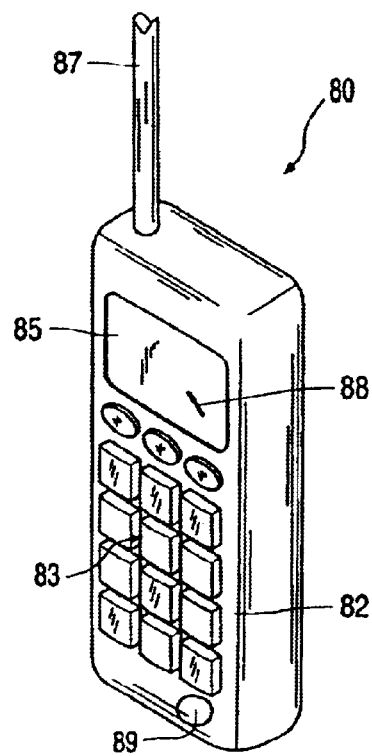
FIG. 12 shows a mobile phone equipped with the input device.

FIG. 12 shows a first and important application of the new input device, namely in a mobile, or cellular, telephone apparatus 80. The front surface of this apparatus is provided with a key entry section 82, which comprises a number of button switches 83 for dial entry and other functions. A display device 85 is disposed above the section 82 and an antenna 87 is provided on the top surface of the phone 80. When a dial, such as a ten-key dial, or another command is entered from the button switches 83, information relating to the entered command is transmitted via a transmitting circuit, not shown, in the phone and the antenna to a base station of a telephone company. Other commands entered via the button switches may be processed in the phone circuitry to activate different functions built in the phone circuitry, such as, selecting a given phone number of a stored list or sending a given message from a table of standard messages. By providing the phone apparatus with an input device and additional circuitry to control the movement of a cursor 88 across the display device 85, some of the existing functions can be performed in an easier way and new functions can be created. The input device 89, only the window of which is shown in FIG. 12, may be arranged at any of several positions on the phone, for example, below the button switches, as shown in FIG. 12, or on one of the side surfaces. Preferably, the window of the input device is located at one of the positions where the fingers are usually placed to hold the phone apparatus. The circuitry of the apparatus is able to display a menu of functions and a movement of a finger across the input window of the device 89 can move the cursor 88 to a given function. Moving the finger in a direction perpendicular to the window can activate this function.

The input device can provide great advantages when integrated in mobile phone provided with a standard protocol, such as the WAP protocol or the I-mode Internet protocol. By means of such a protocol, the apparatus can be used as a terminal for a worldwide communication network, such as the Internet. As this becomes more and more widely spread and used, there is a need for new end user apparatus. First candidates are TV sets equipped with a set-top box and mobile phones. For the new purpose, these apparatus should be equipped with a small input device that fits well in, for example, the TV remote control unit or the mobile phone. The input device of the present invention perfectly meets these requirements.

Figure 13:
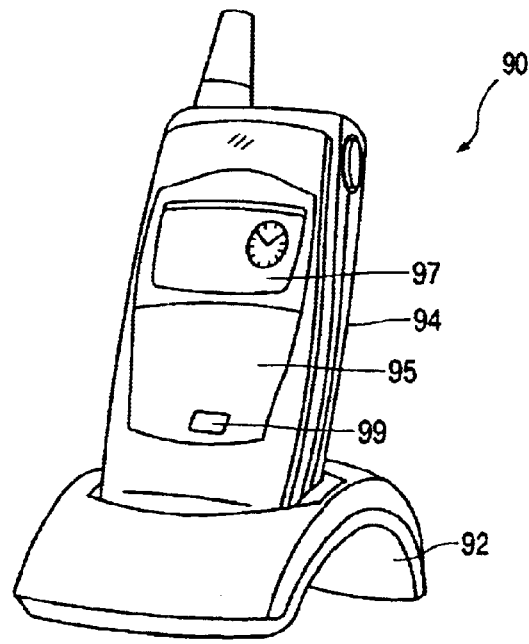
FIG. 13 shows a cordless phone equipped with the input device.

This input device can also be used in a cordless phone apparatus for the same purposes as in the mobile phone apparatus. A cordless phone apparatus 90 is shown in FIG. 13. This apparatus is composed of a base station 92, which is connected to a phone or cable network and the movable apparatus 94 which can be used within an area with a radius of, for example, less than 100 m from the base station. Apparatus 94 comprises a key entry section 95 and a display device 97. In a similar way as described for the mobile phone apparatus, the apparatus 94 can be provided with an input device 99 as described above. Also in FIG. 13, only the window of the input device 99 is shown. Like the mobile phone apparatus, the apparatus 94 should be small and light-weight and implementation of the input device in the cordless phone apparatus provides the same advantages as its implementation in the mobile phone apparatus, especially if the cordless apparatus is provided with, for example, the WAP protocol or the I-mode protocol for access to the Internet.

Figure 14:
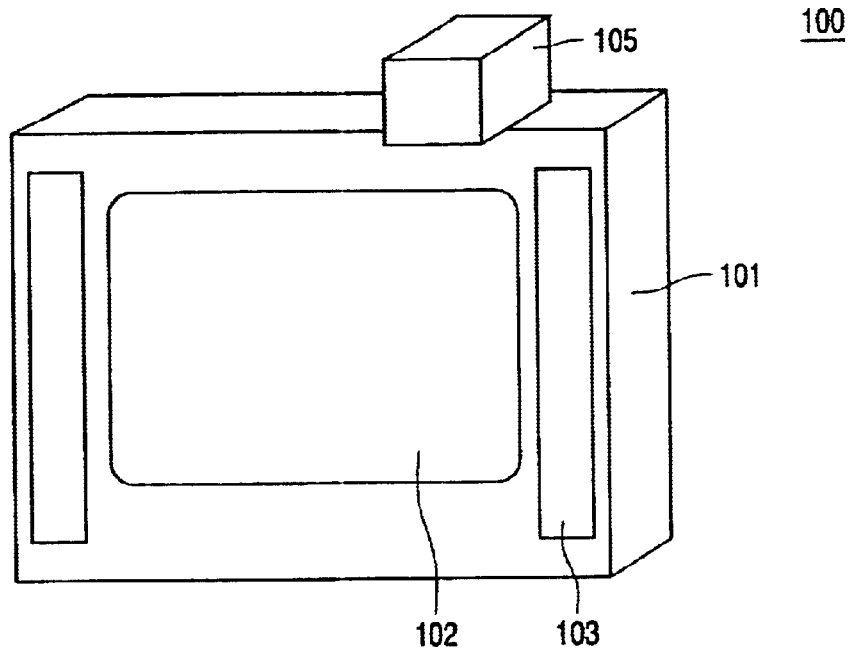
FIG. 14 shows a TV set equipped with the input device.
Figure 14:
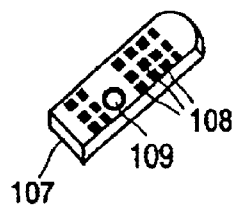

A conventional TV set 100, shown in FIG. 14 and comprising a receiver and display apparatus 101 and a remote control unit 107, can be made suitable for Internet communication, by adding a set-top box 105 to it. This box provides access to the Internet via a phone or cable network, and converts the signal received from the Internet into a signal that can be processed by the TV set in order to display the Internet information. As a user of the TV Internet should have the input device for Internet commands at hand, this input device should be integrated in the remote control. According to the invention, an optical input device 109 as described herein before is built in the remote control unit 107. The device 109, of which only the window is shown, may be arranged between the conventional buttons of the remote control unit or at any other position within reach of any of the human fingers holding the remote control unit.

Figure 15:
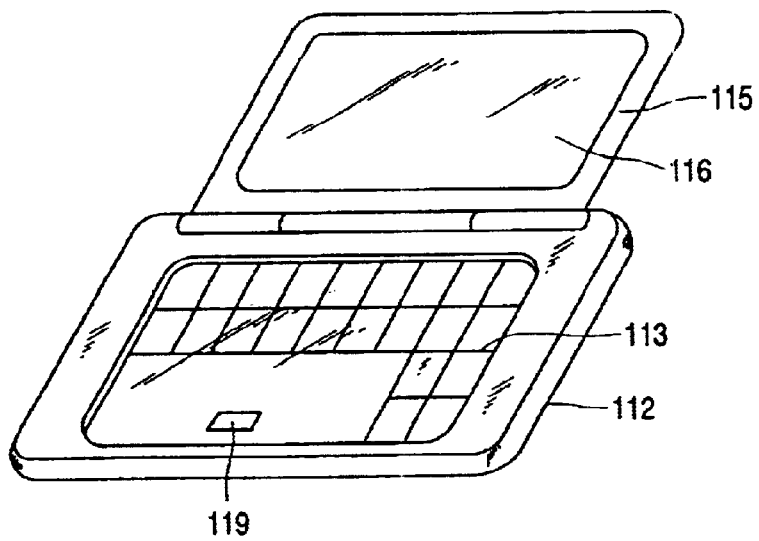
FIG. 15 shows a laptop computer equipped with the input device.

The input device of the present invention may also be used in a computer configuration to replace a conventional hand-driven track-ball mouse or a mouse pad. FIG. 15 shows a portable computer, known as notebook or laptop, comprising a base portion 112 and a cover portion 115 with an LCD display 116. The base portion accommodates the different computer modules and the keyboard 113. In this keyboard, an optical input device 119 of the present invention is arranged which replaces the conventional mouse pad. The input device may be arranged at the position of the conventional mouse pad or at any other easily accessible position. If the input-device is used to measure the movement of a finger in only two directions and thus has to perform only the functions of the conventional mouse pad, it needs to comprise only two diode lasers. Preferably, an input device is used which comprises three diode lasers and thus has a click function so that it replaces also a conventional click button of the notebook.

A hand-held, or palm, computer is a smaller version of the notebook. Also such a palm computer may be provided with an optical input device according to the invention, for example, to replace a pen for touching the display screen, this pen being usually applied to select a function of a displayed menu. The optical input device may be arranged in the keyboard of the palm computer, but also at the inner side of the cover.

Figure 16:
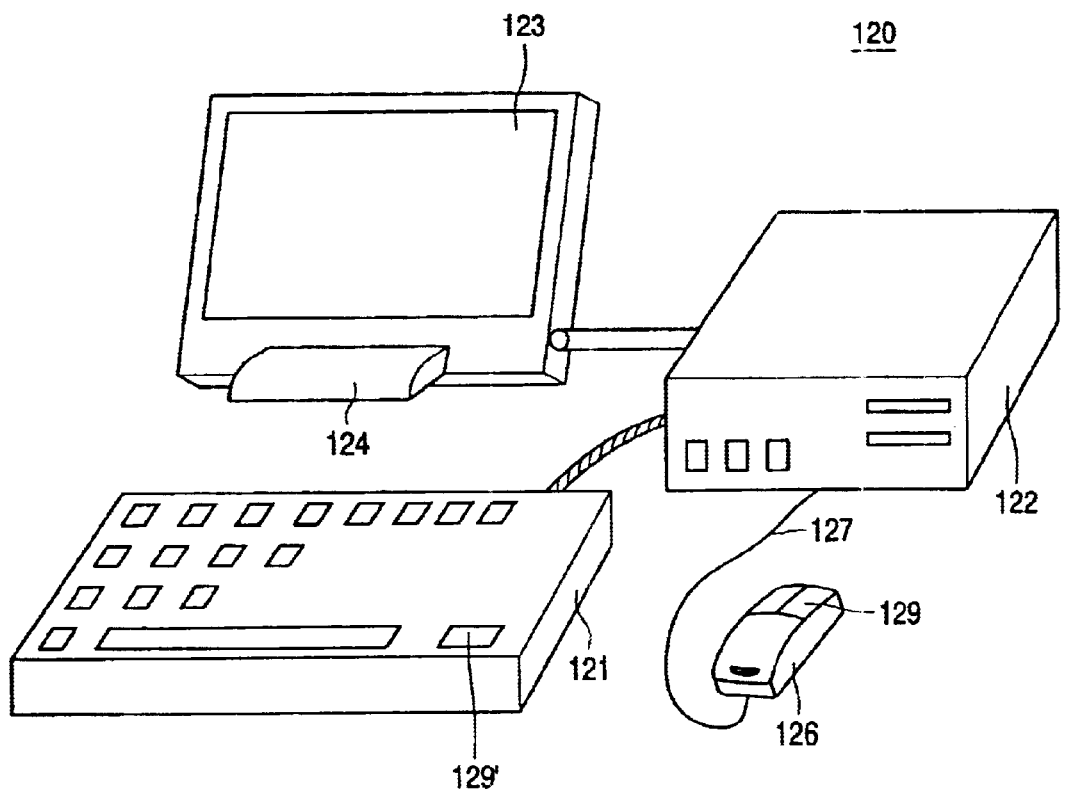
FIG. 16 shows a desktop computer equipped with the input device.

FIG. 16 shows a desktop computer configuration 120 wherein the optical input device can be applied in several ways to replace the conventional trackball mouse. The computer configuration is composed of a keyboard 121, a computer box 122 and a monitor 123. The monitor may be a flat LCD monitor fixed in a support 124, as shown in the figure, or a CRT monitor. Preferably, an optical input device 129 is integrated in the keyboard so that a separate mouse 126 and its cable to the computer box are no longer needed. Instead of this, it is also possible to replace the trackball mouse by an optical mouse equipped with the optical input device. This device is then inverted, i.e., the window of the device faces the underlying surface across which the mouse is moved. The input device measures this movement and not the movement of a human finger across the window as in the previous applications. Use is now made of the great sensitivity of the optical input device. The device is able to detect its movements relative to a rather smooth surface, for example, a piece of blank paper.

In the computer configurations described above, the input device may be arranged in the display portion, instead of in the keyboard portion, for example, in the cover 115 of the laptop computer of FIG. 15 or in the cover of a palm computer. The input device may also be incorporated in displays other than computer displays.

The optical input device can also be incorporated in a normal pen or in a virtual pen to measure the movements of such a pen. In these applications, fibers may be used to guide the radiation from the diode lasers to the window of the device so that the main part of the device can be arranged remote from the pen point.

Figure 17:
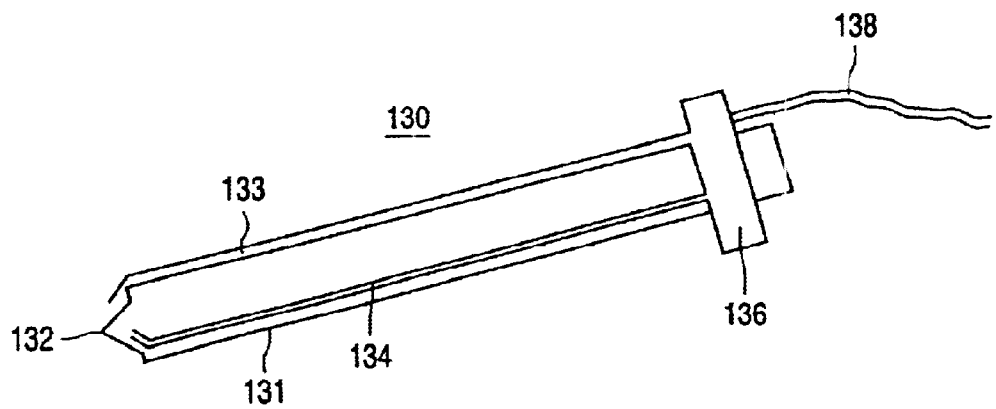
FIG. 17 shows a pen equipped with the input device.

FIG. 17 shows a normal pen having a penholder 131 and a pen point 132. A sleeve-shaped housing 136 for the components of the input device is fixed on the penholder end opposite the pen point. The housing 136 accommodates the diode lasers, the photo diodes and the electronic circuitry of the input device. Optical fibers 133, 134 guide the radiation from the diode lasers. These fibers, for example, end halfway the pen point and form the window of the input device. It is also possible to arrange the diode lasers and photo diodes in a position remote from the pen, and to transmit radiation from the diode lasers to the pen point and back to the photo diodes, via optical fibers, one end of which is fixed to the pen point. When the pen is moved for writing a text or making a drawing, the movement is measured, i.e., followed, by the input device and converted into an electric signal. This signal is, for example, immediately transmitted to a computer via a wire 138 or wirelessly. The computer processes this signal so that the written text or figure can be made visible, immediately or after some time, on the computer display or sent to another computer or archive. The pen may also be provided with means for temporarily storing the text or graphics produced by the pen. Usually the pen is to be moved in the horizontal plane only, and the input device needs to comprise only two diode lasers and two fibers. Under circumstances, it could be useful that a vertical movement of the pen can be measured. For such a case, the input device can be equipped with a third diode laser and fiber.

Figure 18:
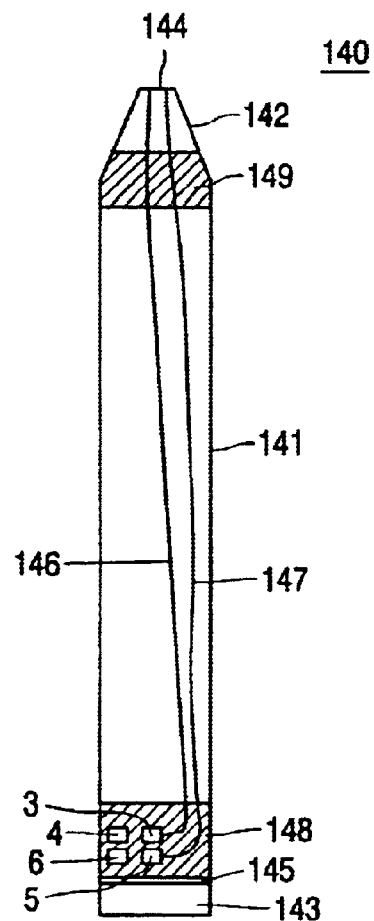
FIG. 18 shows a virtual pen equipped with the input device.

FIG. 18 is a vertical cross-section of a virtual pen. Such a pen is moved across feature-less paper or underlying surface according to a required pattern, which may be letters, words, drawings, etc. This pattern is translated via the input device of the pen into positions. These positions can be translated by a computer into virtual writing and drawing which can be translated into letters or words or displayed, immediately or later on, by this computer or sent to another computer or into a network. The embodiment of the virtual pen shown in FIG. 18 comprises a pen house 141 with a pen point 142, a base plate 143 at the lower side and a transparent window 144 in the pen point. The lower side of the pen accommodates diode lasers 3, 4 and associated photo diodes 4, 6 and electronic circuitry. These components may be mounted on a layer 145, corresponding to the layer 60 in FIGS. 9a and 10. Optical fibers 146 147 are coupled to diode lasers to guide the laser radiation to the window 144. A jacket or sleeves 148, 149 of solid material, for example plastics, fix these fibers.

For both the pen of FIG. 17 and the virtual pen of FIG. 18, the diode lasers and photo diodes may be arranged at a position remote from the pen. The radiation from the diode lasers is transmitted to the pen point and back to the photo diodes via optical fibers, one end of which is fixed to the pen point.

The input device of the present invention may also be used in a fax and/or printer apparatus to detect paper slippage or to measure the paper advancement so that accurate and expensive paper driving motors are no longer needed in such apparatus.

Furthermore, this input device can be used in a hand-held scanner which is used to read information on a piece of paper in order to reproduce this information, immediately or later on, by means of a computer. Such a hand-held scanner is provided with a device for measuring the movement of the scanner across the paper so that a reliable reproduction of the information becomes possible. This measuring device should be small and lightweight and the input device is very suitable for this purpose. The hand-held scanner is known per se and need not be described here. The hand-held scanner of the present invention is different from the known scanners in that it comprises the input device as described above.

Figure 19:
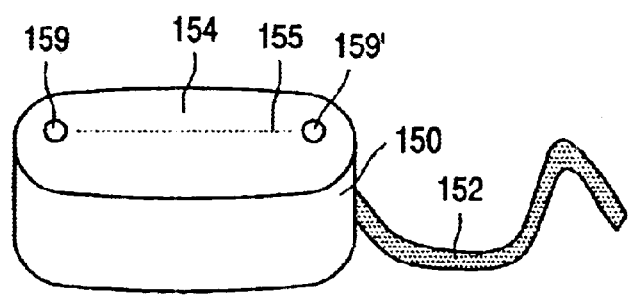
FIG. 19 shows an ultrasound scanning device equipped with the input device.

Ultrasound imaging, or echography, is a medical diagnostic technique in which ultrasound waves, reflected by structures in the human body, are used to build up an image. In addition to its full real-time imaging possibility, it has the advantages of being non-invasive and non-ionizing, like the competitive techniques of X-ray imaging and computerized tomography (CT). The technique uses a scanning apparatus, which is connected to a computer. Ultrasound systems have the additional advantages that they are relatively compact (even portable) and less expensive than, for example, magnetic resonance imaging (MRI) systems which are also non-invasive. In the ultrasound scanning apparatus, ultrasound waves are generated, these waves being sent into the human body. Different kinds of tissues reflect the ultrasound waves differently. The reflected waves are detected in the scanning apparatus and the results of this detection are sent to the computer so as to be analyzed and used to build up an image to be displayed. This image is a two-dimensional cross-section of the part of the human body momentarily examined. By moving the scanning apparatus across the body, other parts of this body can be examined. The ultrasound scanning apparatus need not be described here in detail because it is a well-known apparatus. The input device of the present invention can be incorporated in the ultrasound scanner to register its movement, as is very schematically illustrated in FIG. 19. This figure shows the scanning apparatus 150 with a cable 152 connecting it to a computer, not shown. When in use, the surface 154 of the apparatus faces the body to be examined. Reference 159 denotes the input device of which only the window is shown and by means of which the movement of the apparatus, for example, along the imaginary line 155 can be registered. Such an input device with one or two measuring axes provides new possibilities for the ultrasound scanners because, in addition to the two-dimensional ultrasound images, information about the movements of the scanner is obtained and processed by the computer so that the latter can create a three-dimensional image of the body being examined. Optionally, the scanning apparatus may be provided with a second input device 159'. Because the input device is compact and cheap, it can easily be incorporated in existing ultrasound scanning apparatus without adding much cost and without re-designing the apparatus. The input device of, for example, the mobile phone of FIG. 12 can be used in an up/down scroll switch for scrolling menu charts. Such an input device may also have the capability to determine a click, which activates a menu being pointed at by a cursor controlled by the up/down switch. Such an input device can be easily built of discrete components, which allows fast new developments.

Figure 20:
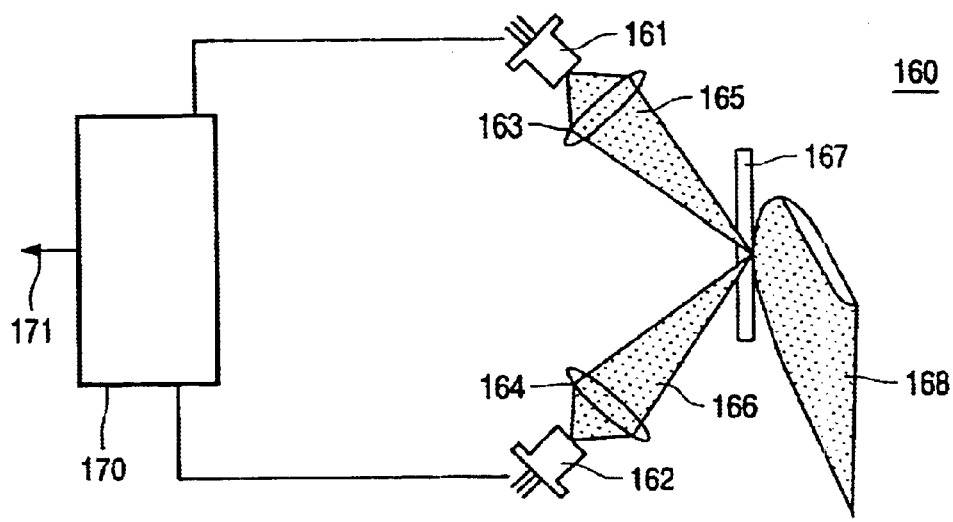
FIGS. 20 and 21 shows a first embodiment of an input device for scrolling and clicking.

FIG. 20 shows a first embodiment of a scroll and click input device 160. It comprises two laser/diode units 161, 162, which each comprises a diode laser and a photodiode. Instead of such units, also separate diode lasers and photo diodes may be used. In each of the paths of the radiation emitted by the units 161 and 162, a lens 163 and 164, respectively, is arranged, these lensts focusing radiation beams 165 and 166 of the associated units 161 and 162 in an action plane 167, which may be the plane of a window. This window 172 may form part of the housing 169 of the device in which the device is used, for example, a mobile phone as shown in side view in FIG. 21. The laser/diode units and the associated lenses may be so arranged that the chief rays of the beams 165 and 166 are at opposite angles with respect to the normal to the window 172, for example at angles of +45° and −45°, respectively.

An object, for example, a human finger 168, is moved across the action plane for a scrolling and/or clicking action. As described herein above, both actions cause a Doppler shift in the radiation reflected by the finger towards the laser/diode units 161 and 162. The output signals of the detectors of these units are supplied to signal processing and laser drive electronic circuitry 170. This circuitry evaluates the movements of, for example, the controlling finger 168 and supplies information about these movements at its output 171. The laser/diode units 161 and 162, the lenses 165 and 166, the window 172 and the electronic circuitry 170 and software may be integrated in one module. This module is placed as such in the mobile phone or in another apparatus, which should be provided with a scrolling and clicking function. It is also possible to implement the input device with discrete elements. Especially part of the signal processing may be carried out by a micro-controller or other controlling means which forms part of the mobile phone or other apparatus, such as, a remote control, a cordless phone or a portable computer.

As described hereinbefore, a movement of a finger or other object towards and away from the laser/diode units may be detected by modulating the laser currents and counting the pulses received by the detectors. From the output signals $Sign_1$ and $Sign_2$ of these detectors, which represent velocities of the object along the chief rays of the beams 165 and 166, respectively, the velocity ($V_{scroll}$) parallel to the window and the velocity ($V_{click}$) perpendicular to the window can be calculated as follows:

$$V_{scroll} = \tfrac{1}{2}\sqrt{2} \cdot (Sign_1 - Sign_2)$$

$$V_{click} = \tfrac{1}{2}\sqrt{2} \cdot (Sign_1 + Sign_2)$$

Figure 21:
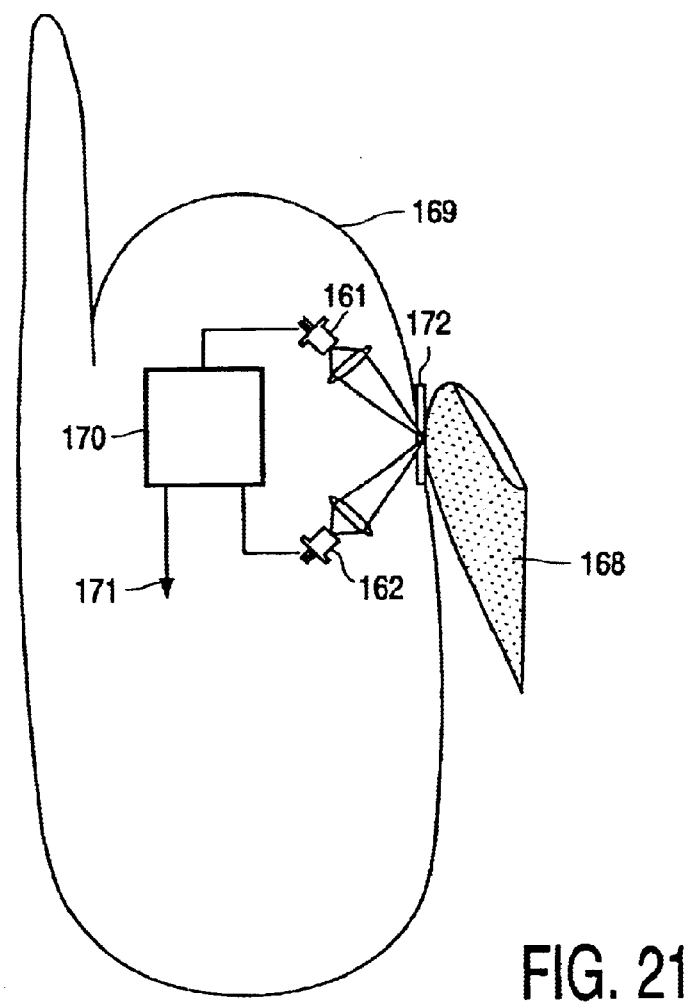
Figure 22:
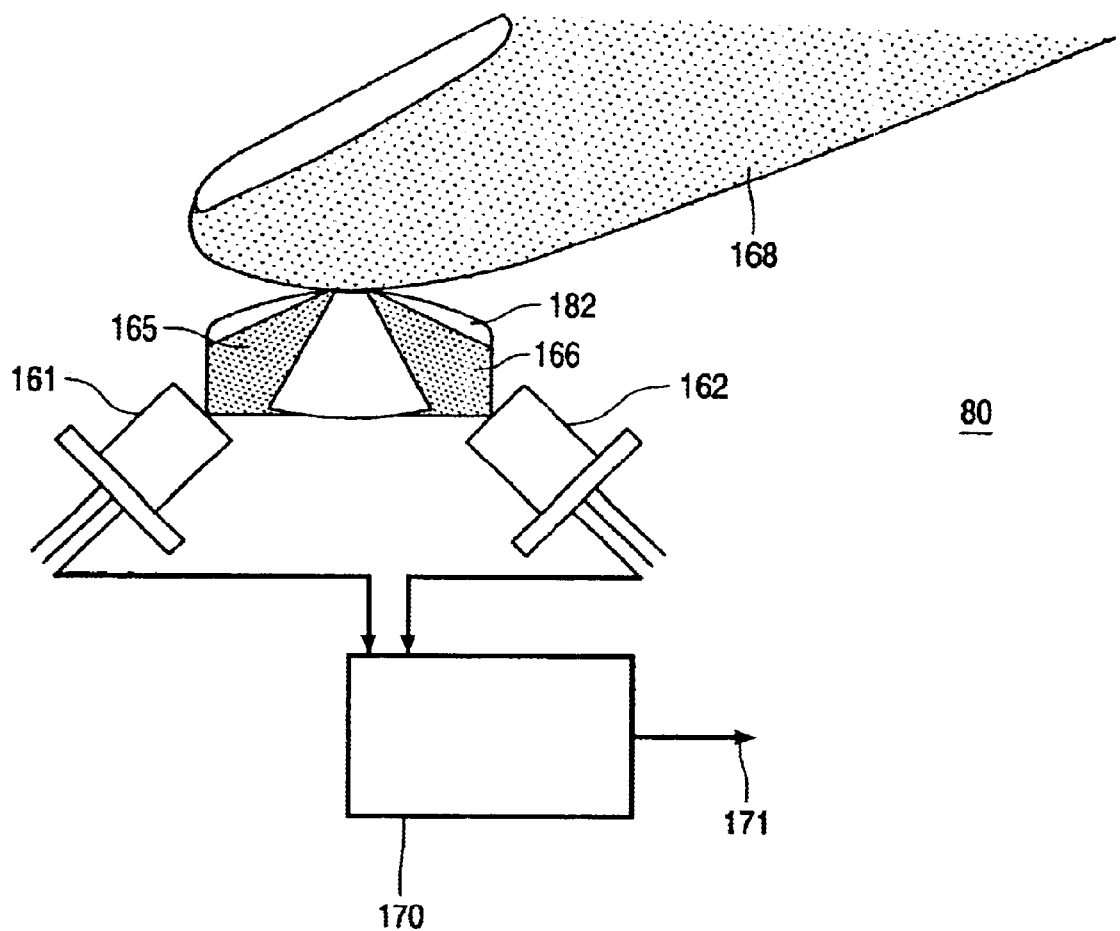
FIG. 22 shows a second embodiment of such a device.

FIG. 22 shows a second embodiment of a scroll and click input device 180. This embodiment differs from that of FIGS. 20 and 21 in that the two lenses 163 and 164 and the window 172 has been replaced by a single component 182. This element focuses both beams 165 and 166 on its upper surface 184, which forms a window.

If the input device of FIGS. 20–22 needs to provide only a scrolling function, only one diode laser, lens and detector is required, in principle.

What is claimed is:

1. A method of supplying an input device with user information by measuring a movement along at least one measuring axis, said method comprising the steps:

moving, under user control, an object and the input device relative to each other along said at least one measuring axis;

illuminating an object surface with a measuring laser beam radiation, emitted from a laser cavity of a laser device, for each measuring axis; and converting a selected portion of the measuring laser beam radiation reflected by the object surface into an electric signal, said electric signal being representative of the movement along said measuring axis, characterized in that said converting step comprises:

selecting the measuring laser beam radiation reflected back along the measuring laser beam radiation and re-entering the laser cavity emitting the measuring laser beam radiation, said reflected measuring laser beam radiation undergoing Doppler frequency shift upon relative motion of the object and the input device;

measuring changes in operation of the laser cavity, said changes being due to interference of the re-entering measuring laser beam radiation and an optical wave in the laser cavity and being representative of the movement; and generating said electric signal in dependence on said measured changes in operation of the laser cavity.

2. The method as claimed in claim 1, characterized in that said method further comprises the step:

detecting a direction of the movement along said at least one measuring axis by determining a shape of the electric signal representing the changes in operation of the laser cavity.

3. The method as claimed in claim 1, characterized in that said measuring step comprises measuring an impedance of the laser cavity.

4. The method as claimed in claim 1, characterized in that said measuring step comprises measuring an intensity of the measuring laser beam radiation.

5. A method of measuring the movement of an input device and an object relative to each other along at least one measuring axis, the method comprising the steps of:

illuminating an object surface with a measuring laser beam radiation, emitted from a laser cavity of a laser device, for each measuring axis; and converting a selected portion of the measuring laser beam radiation reflected by the object surface into an electric signal, said electric signal being representative of the movement along said measuring axis, characterized in that said converting step comprises:

electing the measuring laser beam radiation reflected back along the measuring laser beam radiation and re-entering the laser cavity emitting the measuring laser beam radiation; and measuring changes in operation of the laser cavity, said changes being due to interference of the re-entering measuring laser beam radiation and an optical wave in the laser cavity and being representative of the movement; and generating said electric signal in dependence on said measured changes in operation of the laser cavity, characterized in that said method further comprises the step:

determining a direction of the movement along said at least one measuring axis supplying the laser cavity with a periodically varying electric current, and comparing first and second measuring signals with each other, said first and second measuring signals being generated during alternating first half-periods and second half-periods, respectively.

6. The method as claimed in claim 5, characterized in that in said determining a direction of the movement step, said comparing comprises subtracting the first and second measuring signals from each other.

7. A method of measuring the movement of an input device and an object relative to each other along at least one measuring axis the method comprising the steps of:

illuminating an object surface with a measuring laser beam radiation, emitted from a laser cavity of a laser device, for each measuring axis; and converting a selected portion of the measuring laser beam radiation reflected by the object surface into an electric signal, said electric signal being representative of the movement along said measuring axis, characterized in that said converting step comprises:

selecting the measuring laser beam radiation reflected back along the measuring laser beam radiation and re-entering the laser cavity emitting the measuring laser beam radiation; and measuring changes in operation of the laser cavity, said changes being due to interference of the re-entering measuring laser beam radiation and an optical wave in the laser cavity and being representative of the movement; and generating said electric signal in dependence on said measured changes in operation of the laser cavity, characterized in that said method is used to determine a click action by a single movement of the object and the input device relative to each other along an axis substantially perpendicular to the object surface.

8. A method of measuring the movement of an input device and an object relative to each other along at least one measuring axis, the method comprising the steps of:

illuminating an object surface with a measuring laser beam radiation, emitted from a laser cavity of a laser device, for each measuring axis; and converting a selected portion of the measuring laser beam radiation reflected by the object surface into an electric signal, said electric signal being representative of the movement along said measuring axis, characterized in that said converting step comprises:

selecting the measuring laser beam radiation reflected back along the measuring laser beam radiation and re-entering the laser cavity emitting the measuring laser beam radiation; and measuring changes in operation of the laser cavity, said changes being due to interference of the re-entering measuring laser beam radiation and an optical wave in the laser cavity and being representative of the movement; and generating said electric signal in dependence on said measured changes in operation of the laser cavity, characterized in that said method is used to determine both a scroll action and a click action by movement of the object and the input device relative to each other in a first direction parallel to the object surface and in a second direction substantially perpendicular to the object surface.

9. An input device for receiving user information generated by moving, under user control, an object and the input device relative to each other along at least one measuring axis, said input device being provided with an optical module for measuring the relative movement of the object and the input device, said module comprising:

at least one diode laser having a laser cavity for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said reflected measuring laser beam radiation having undergone a Doppler frequency shift upon relative movement of the object and the input device, whereby the user supplies said user information to said input device by moving the input device relative to said object, said changes further being representative of the relative movement between the object and the module.

10. The input device as claimed in claim 9, characterized in that the measuring means measures a variation of an impedance of the laser cavity.

11. The input device as claimed in claim 9, characterized in that the measuring means is a radiation detector for measuring an amount of radiation emitted by the laser cavity.

12. The input device as claimed in claim 11, characterized in that the radiation detector is arranged at a side of the laser cavity opposite from where the measuring laser beam radiation is emitted.

13. The input device as claimed in claim 9, wherein said optical module comprises at least one laser and an associated detector, characterized in that the optical means comprises a lens arranged between said at least one laser and associated detector, and an action plane, the at least one laser being positioned eccentrically with respect to the lens.

14. The input device as claimed in claim 9, characterized in that said at least one laser comprises at least one horizontal emitting laser, and the device comprises, for each horizontal emitting laser, a reflecting member reflecting the measuring laser beam radiation from the associated horizontal emitting laser to an action plane.

15. The input device as claimed in claim 9, characterized in that the optical module comprises a base plate on, which at least one diode laser and associated detector are mounted, a cap member fixed to the base plate and comprising a window and a lens accommodated in the cap member.

16. The input device as claimed in claim 15, characterized in that the base plate, the cap member and the lens are made of a plastic material.

17. An input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, and characterized in that the optical module comprises at least two diode lasers and at least one detector for measuring a relative movement of the object and the device along a first and a second measuring axis, said first and second measuring axes being parallel to said surface of the object.

18. An input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, and characterized in that the optical module comprises three diode lasers and at least one detector for measuring a relative movement of the object and the device along a first, a second and a third measuring axis, the first and second measuring axes being parallel to said surface of the object and the third axis being perpendicular to said surface.

19. An input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, wherein said optical module determines both a scroll action and a click action, and characterized in that the optical module comprises two diode lasers and at least one detector for measuring relative movements of the object and the input device along a first measuring axis parallel to the object surface and along a second measuring axis substantially perpendicular to the object surface.

20. An input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, wherein said optical module determines both a scroll action and a click action, and characterized in that the optical module comprises two diode lasers and at least one detector for measuring relative movements of the object and the input device along a first and a second measuring axis, said first and second measuring axes being at opposite angles with respect to a normal to the object surface.

21. An input device provided with an optical module for measuring a movement of the input device relative to an object along at least one measuring axis, said module comprising:

at leant one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, wherein said optical module comprises at least one laser and an associated detector, characterized in that the optical means comprises a lens arranged between said at least one laser and associated detector, and an action plane, the at least one laser being positioned eccentrically with respect to the lens, and wherein said optical module comprises two diode lasers, characterized in that the two diode lasers are arranged such that lines connecting respective centers of the two diode lasers with an optical axis of the lens are at an angle of substantially 90° with respect to each other.

22. An input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module, wherein said optical module comprises at least one laser and an associated detector, characterized in that the optical means comprises a lens arranged between said at least one laser and associated detector, and an action plane, the at least one laser being positioned eccentrically with respect to the lens, and wherein said optical module comprises three diode lasers, characterized in that the three diode lasers are arranged such that lines connecting respective centers with an optical axis of the lens are at an angle of substantially 120° with respect to each other.

23. An input device provided with an optical module for measuring a movement of the input device relative to an object along at least one measuring axis, said module comprising:
   at least one laser, having a laser cavity, for generating a measuring laser beam radiation;
   optical means for converging the measuring laser beam radiation in a plane near the object; and
   converting means for converting the measuring laser beam radiation reflected by a surface of the object into an electric signal,
   characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module,
   characterized in that the optical module comprises a base plate on which at least one diode laser and associated detector are mounted, a cap member fixed to the base plate and comprising a window and a lens accommodated in the cap member, and the lens is integrated in the cap member having an internal surface which is curved towards the base plate.

24. An input device provided with an optical module for measuring a movement of the input device relative to an object along at least one measuring axis, said module comprising:
   at least one laser, having a laser cavity, for generating a measuring laser beam radiation;
   optical means for converging the measuring laser beam radiation in a plane near the object; and
   converting means for converting the measuring laser beam radiation reflected by a surface of the object into an electric signal,
   characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module,
   characterized in that said at least one laser is coupled to a respective entrance side of at least one separate light guide, a respective exit side of said at least one separate light guide being positioned at the window of the input device.

25. The input device as claimed in claim 24, characterized in that the light guides are optical fibers.

26. The input device as claimed in claim 24, characterized in that said input device comprises three diode lasers and three light guides, and the exit sides of the three light guides are arranged in a circle at a mutually angular spacing of substantially 120°.

27. A mouse for a desktop computer, wherein said mouse comprises an input device provided with an optical module for measuring a movement of the input device relative to an object along at least one measuring axis, said module comprising:
   at least one laser, having a laser cavity, for generating a measuring laser beam radiation,
   optical meant for converging the measuring laser beam radiation in a plane near the object; and
   converting means for converting the measuring laser beam radiation reflected by a surface of the object into an electric signal,
   characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

28. A keyboard for a desktop computer, wherein said keyboard comprises an input device provided with an optical module for measuring a movement of the input device relative to an object along at least one measuring axis, said module comprising:
   at least one laser, having a laser cavity, for generating a measuring laser beam radiation;
   optical means for converging the measuring laser beam radiation in a plane near the object; and
   converting means for converting the measuring laser beam radiation reflected by a surface of the object into an electric signal,
   characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

29. A laptop computer having integrated therein an input device provided with an optical module for measuring a movement of the input device relative to an object along at least one measuring axis, said module comprising:
   at least one laser, having a laser cavity, for generating a measuring laser beam radiation;
   optical means for converging the measuring laser beam radiation in a plane near the object; and
   converting means for converting the measuring lager beam radiation reflected by a surface of the object into an electric signal,
   characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

30. A display having integrated therein an input device provided with an optical module for measuring a movement of the input device relative to an object along at least one measuring axis, said module comprising:
   at least one laser, having a laser cavity, for generating a measuring laser beam radiation;
   optical means for conversing the measuring laser beam radiation in a plane near the object; and
   converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

31. An ultrasound diagnostic apparatus having integrated therein at least one input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

32. A hand-held scanner apparatus having integrated therein at least one input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

33. A remote control unit having integrated therein at least one input device provided with an optical module for measuring a movement of the input device relative to an object along at least one measuring axis, said module comprising:

at least one laser, having a laser cavity, for generating a measuring laser beam radiation;

optical means for converging the measuring laser beam radiation in a plane near the object; and converting means for converting the measuring laser beam radiation reflected by a surface of the object into an electric signal, characterized in that the converting means comprises measuring means for measuring changes in operation of the laser cavity, said changes being due to interference of the reflected measuring laser beam radiation re-entering the laser cavity and an optical wave in the laser cavity, said changes further being representative of a relative movement between the object and the module.

* * * * *